Jan. 28, 1947. T. W. BERGQUIST 2,414,794
SAFETY VALVE
Filed Dec. 13, 1944 2 Sheets-Sheet 2

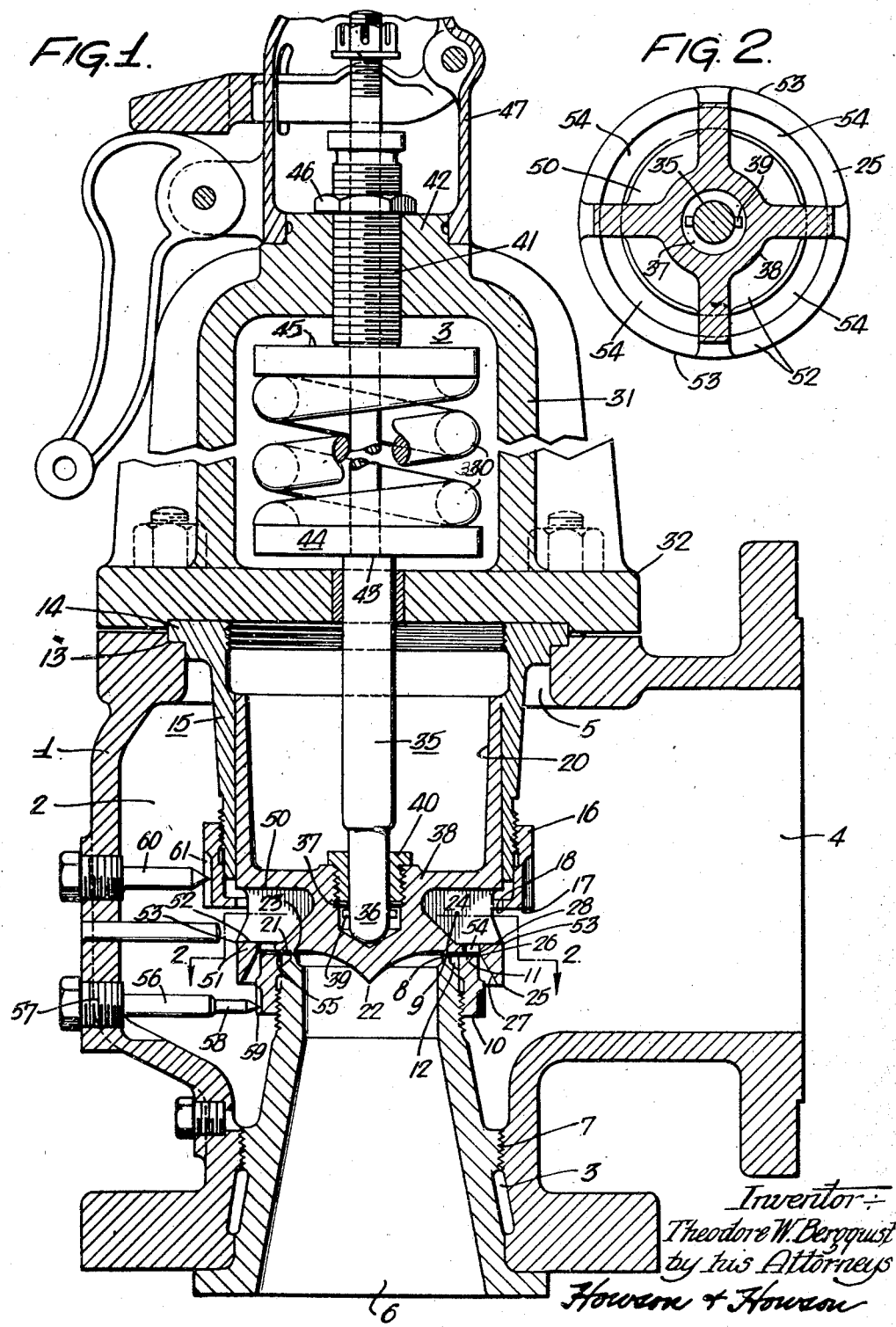

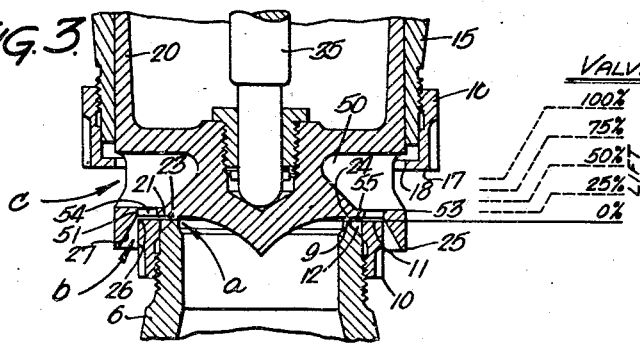

FIG.3.

VALVE "CLOSED" (READY TO POP)

- 0% LIFT.
- 99.9% SET PRESSURE.
- PORT "a" CLOSED.
- PORT "b" CLOSED.
- PORT "c" FULL OPEN.

No pressure on skirted baffle.

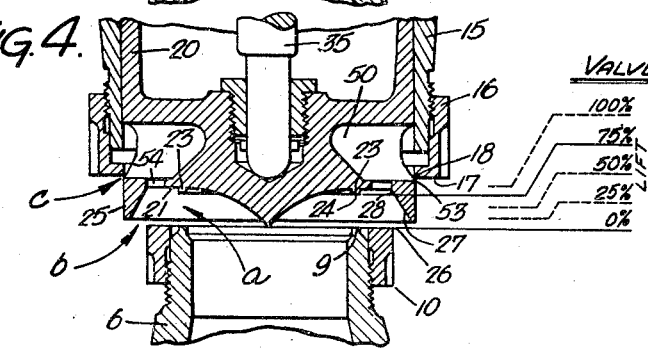

FIG.4.

VALVE "POPPED"

- APPROX. 75% FULL LIFT.
- 100% SET PRESSURE.
- PORT "a" 75% OPEN
- PORT "b" 75% OPEN
- PORT "c" NEARLY CLOSED

Partial pressure acting upon skirted baffle.

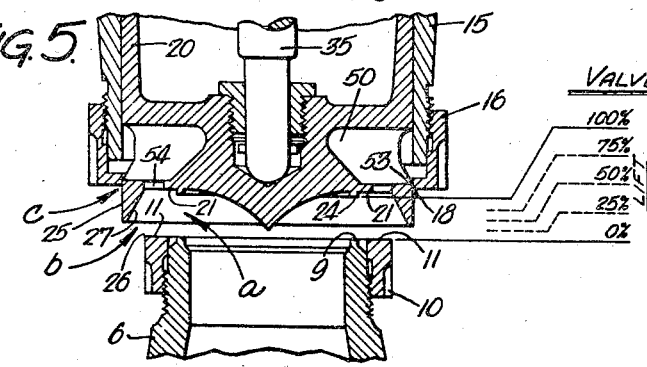

FIG.5.

VALVE "FULL OPEN"

- 100% FULL LIFT.
- 103% SET PRESSURE.
- PORT "a" 100% OPEN.
- PORT "b" 100% OPEN.
- PORT "c" CLOSED

Full pressure acting upon enlarged baffle area.

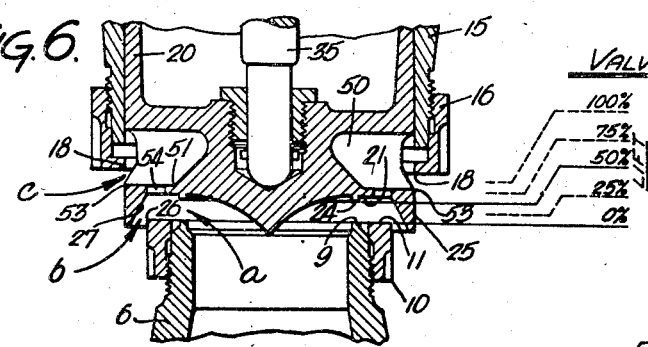

FIG.6.

VALVE "CLOSING"

- APPROX. 50% FULL LIFT.
- 97% SET PRESSURE.
- PORT "a" 50% OPEN.
- PORT "b" 50% CLOSED
- PORT "c" PARTIALLY OPEN

Reduced pressure acting upon a rapidly diminishing baffle area.

Inventor:
Theodore W. Bergquist
by his Attorneys
Howson + Howson

Patented Jan. 28, 1947

2,414,794

UNITED STATES PATENT OFFICE 2,414,794

SAFETY VALVE

Theodore W. Bergquist, Willow Grove, Pa., assignor to J. E. Lonergan Company, Philadelphia, Pa., a corporation of Pennsylvania Application December 13, 1944, Serial No. 567,955

2 Claims. (Cl. 137—53)

This invention relates to safety valves for pressure fluid systems, reservoirs, pressure generators, etc.; and the present application constitutes a continuation-in-part of my prior application Serial No. 524,049, filed February 26, 1944.

The primary object of the invention is to provide a relief or safety valve which will embody certain improved structural features affording numerous operating advantages over valves of the prior art, such as higher lift, lower blowdown, greater stability, greater protection for the system or vessel to which the valve is applied, less stress on the seating surfaces of the valve, higher discharge capacity, elimination of drumming, elimination of sudden and violent pressure fluctuations, and so forth.

The foregoing structural improvements and resultant advantages will be readily understood from the following description, with reference to the accompanying drawings, of which:

Fig. 1 is a longitudinal sectional elevation of the preferred form of valve;

Fig. 2 is a sectional plan view taken on the line 2—2 in Fig. 1;

Figs. 3, 4, 5 and 6 are fragmentary longitudinal sectional elevations diagrammatically illustrating the principal portions of the valve shown in Fig. 1 in different relative positions during one cycle of operation of the valve.

As shown in Figs. 1 and 2 of the drawings, the valve of the present invention comprises a valve body 1, in which is formed a main chamber 2, an inlet duct 3, an outlet or discharge duct 4, and a complementary chamber 5 which is axially aligned with the inlet duct 3.

The outlet duct 4 and the complementary chamber 5 are in direct communication with the main chamber 2, while the inlet duct 3 has communication with the main chamber 2 only through a hollow frusto-conical nozzle 6 having an intermediate annular external portion thereof threaded into a correspondingly threaded annular internal counterbore 7 formed in the duct 3.

The inner end of the nozzle 6 is provided with an annular axial extension 8 having a narrow flat circular end face 9 disposed in a plane at right angles to the axis of the nozzle 6, and which constitutes the seat of the valve.

Below the annular axial extension 8, the nozzle 6 is externally threaded to receive internal threads of an adjustable warn ring 10. The ring 10 is provided with a relatively wide flat annular end face 11, which like the valve seat 9 is also at right angles to the axis of the nozzle 6. The wide flat face 11 of the nozzle-encircling ring 10 is adapted for adjustment to various planes parallel to the plane of the encircled valve seat 9, axially of the nozzle 6.

An annular recess 12 is formed by and between the inner circumferential edge of the flat annular end-face 11 of the ring 10 and the outer circumferential edge of the flat annular end face of the axial extension 8 on the nozzle 6 which forms the valve seat 9.

The outer end of the complementary chamber 5 is counterbored at 13, for the reception of a corresponding external annular flange 14 formed on a cylindrical piston guide 15, which latter projects into the main chamber 2.

Adjacent its inner end, the cylindrical guide element 15 is externally threaded to receive internal threads formed in one end of a control ring 16, an opposite flat end 17 of which is adapted to be adjustably maintained in a plane at right angles to the axis of the cylindrical guide 15, parallel to and spaced a predetermined distance from the plane of the valve seat 9, axially of the chamber 2.

The control ring 16 is axially adjustable relative to the cylindrical piston guide 15 to vary the distance between the plane of the inner circular edge 18 of its lower face and the plane of the valve seat 9.

Slidably mounted within the piston guide 15, for axial movement in opposite directions therein, is a valve piston 20, which is provided with a substantially flat end face 21 disposed in a plane substantially at right angles to the coinciding axes of the piston 20 and its surrounding guide 15.

In the center of the end face 21 of the piston 20 is a downwardly projecting spreader cone 22, by which flowing fluid impinging against the surface 21 of the piston 20 is directed radially outward, in all directions, toward an annular rib 23 which is formed on the surface 21 concentric to the axis of the piston 20.

The rib 23 is provided with a flat circular narrow face 24 of substantially the same inside and outside diameter as the flat circular face 9 of the valve seat, against which the circular face 24 is adapted to bear and to register, concentrically, to close off flow of pressure fluid from the bore of the nozzle 6 into the valve chamber 2.

The piston 20 is of greater diameter than the ring 10 and is provided with an axially projecting skirt or cape 25 which circumferentially encircles the outer peripheral edge 26 of the flat annular surface 11 of the ring 10, and extends axially from the head surface 21 of the piston 20 over a substantial portion of the axial length of the ring 10.

The inner surface 27 of the skirt 25 is of a frusto-conical form and flares radially outward from a circle 28 describing the intersection of the frusto-conical surface 27 of the skirt 25 with the flat head surface 21 of the piston 20, which circle 28 is of slightly greater diameter than the peripheral edge 26 of the ring 10.

The piston seating surface 24 is normally maintained in contact with the valve seat 9, by a loading spring 30 which is housed in a substantially cylindrical spring casing 31, which latter is provided at one end with a head plate 32. The plate 32 is adapted to be secured to the valve body 1 around the complementary chamber 5, in any suitable manner, as by bolts, screws, etc.

The piston 20 is provided with a suitable stem 35 having one end 36 rounded and seated in an internally threaded axial recess 37 formed in the solid end portion or head 38 of the piston 20.

The piston stem or rod 35 has radially extending pins 39, 39 which extend radially outward from the piston stem 35 into the recess below the lower end of a star nut 40 threaded in the recess 37.

The piston stem or rod 35 projects from the head 38 of the piston axially through the hollow body thereof, the guide 15 and the end plate 32 of the spring case 31, into and through the cylindrical spring case 31. The second end of the rod 35 is slidably mounted in an axial bore formed in an adjusting screw 41 which is threaded into a hub or boss 42 formed at and closing the second end of the spring case 31.

Mounted on and resting against an annular shoulder 43 on the stem 35, within the hollow spring casing 31, is a spring abutment washer 44 against which one end of the loading spring 30 bears, the opposite end of said spring bearing against a loose abutment washer 45 slidably mounted on the stem 35 and which rests against the inner end of the adjusting screw 41.

The loading spring 30 may be set to any desired popping pressure of the valve, by proper adjustment of the screw 41, and the screw is secured in its adjusted position by a jamb nut 46. A cap 47 covers the adjusting screw and its lock nut and is removably secured on the periphery of a central boss 42 in which the adjusting screw 41 is mounted.

As shown in Figs. 1 and 2, the closed end 38 of the piston 20 is provided with a deep circumferential groove in the form of a substantially annular recess 50 which produces an annular flange-like portion 51 on the end of the piston 20. The flange 51 has an inner surface 52 substantially parallel to and axially spaced from the end surface 21 of the piston 20, and where the flange surface 52 intersects with the peripheral surface of the piston 20 a relatively sharp cut-off edge 53 is formed to cooperate with the sharp inner circular edge 18 of the control ring 16 for purposes hereinafter described.

Ports 54, 54 are formed in and extend through the flange 51 of the piston 20 from the end face 21 thereof to the face 52 of the annular recess 50.

In operation of the valve shown in Figs. 1 and 2, the loading spring 30 is "set," by adjusting the screw 41, to any desired pressure at which the safety valve is to "pop" or blow-off, i. e. the pressure at which, for example 100# per square inch, acting against the head face 21 of the piston 20, the piston will rise slightly from its fully closed position shown in Fig. 3, and displace the circular seating face 24 from the circular valve seat 9.

Upon initial separation of the circular faces 9 and 24, pressure fluid will flow radially in a horizontal direction through a circular discharge port a formed by and between the separated seating surfaces 9 and 24, into an annular space 55 formed by and between the broad flat annular surface 11 of the ring 10 and the opposed similar broad flat annular face 21 of the flange 51 on the piston 20.

A portion of the pressure fluid entering the annular space 55 escapes therefrom through the ports 54 from the under side of the flange 51 to the upper side thereof, into the substantially annular space 50 in the piston 20, and from this space 50 into the valve chamber 2 through a circular port c formed by and between the inner sharp circular edge 18 of the control ring 16 and the sharp peripheral edge 53 of the flange 51.

The flat annular face 21 of the under side of the piston flange 51 and the frusto-conical surface 27 of the piston skirt 25, combined, form a baffle against which the pressure fluid escaping through the annular discharge port a reacts.

At the instant of initial popping of the valve, (100% of the "set" pressure) the effects of the skirted baffle afforded by the frusto-conical surface 27 are substantially nil and the lifting of the valve is then primarily effected by the expansion of the pressure fluid in the annular chamber 55. However as soon as the valve is lifted to an appreciable extent the effective area of the skirted baffle increases progressively, as the surface 27 moves upwardly to a greater extent beyond and with respect to the sharp peripheral edge 26 of the flat annular surface 11 of the warn ring 10, between which and the downwardly flaring surface 27 of the skirt 25 is formed an escape port b.

As shown in Fig. 3, just before the valve pops, the port a is fully closed, the port b is substantially closed as no contact between the edge 26 and surface 27 is ever actually effected, and the port c is fully open.

When the valve pops, the pressure fluid escaping through the partially opened port a expands in the annular space 55 and starts to raise the valve. As the valve piston 20 rises the opening of the port b progressively increases and the port c progressively closes until the position of Fig. 4 is reached, wherein the ports a and b are substantially 75% open and the port c is practically closed.

The fluid pressure reacting against the constantly increasing area of the baffle surface of the piston raises the valve until the port c is entirely closed, cutting off upward escape of pressure fluid completely, through the ports 54, from beneath piston 20.

The full force of the pressure fluid passing through the port a, which has reached substantially 103% of the "set" pressure, then becomes effective to raise the valve to its full open position shown in Fig. 5 wherein the ports a and b are fully open with the pressure reacting against the full area of the baffle surface formed by the combined areas of the annular surface 21 and the frusto-conical surface 27 of the piston.

The full force of the fluid pressure acting against the full area of the baffle surface maintains the valve in its fully open position until the pressure in the vessel or system to which the valve 1 is connected begins to drop. As the medium in the vessel is relieved the pressure under the piston decreases and accordingly the lift diminishes rapidly until the pressure has dropped to substantially 97% of the "set" pressure, at which point the valve is ready to close abruptly. The piston 20 descends under the influence of the loading spring 30 as a result of the decrease in the pressure of the fluid in the nozzle 6, whereupon the port c opens, as shown in Fig. 6, and permits the pressure fluid to escape from under the piston 20 through the ports 54 in the flange 51 into the annular recess 50, in the piston, from which it escapes to the valve chamber 2 through the now rapidly opening port c.

As the port c opens, the port b closes, resulting in a rapidly decreasing effective baffle area of the piston thus allowing the valve to close sharply in returning from the position of Fig. 6 to the position of Fig. 3.

By careful adjustment of the control ring 16, the valve can be set to reduce the pressure in the nozzle 6 as desired. For example, the valve may be set to "pop" or "blow-off" at 100# per square inch pressure and close again when the pressure is reduced to 98# per square inch. By turning the ring 16 up or down the pressure at which the valve closes can be regulated to suit conditions. If the valve closes at a pressure higher than desired the ring can be turned down closer to the edge 53 of the piston flange 51 and thereby cause the valve to remain longer off its seat. Conversely, if the reclosing pressure is too low the ring is turned up, i. e. further away from edge 53 of the piston flange 51.

By moving the control ring 16 axially to bring the edge 18 thereof closer to or further away from the edge 53 of the piston flange 51, the pressure at which the piston 20 returns to its seat can be accurately controlled and this with the cushioning effect obtained by proper adjustment of the warn ring 19 prevents the valve from closing with the force of a hammer blow which would be injurious to the seating surfaces of the valve and piston.

When the correct adjustment of the ring 19 is attained it may be locked in position by a ring pin 56 which has an enlarged outer end 57 threaded into and through the shell of the valve body 1, and a relatively pointed inner end 58 entering longitudinal flutes 59 in the lower portion of the periphery of the ring 19.

In a similar manner, when the control ring 16 is adjusted to its final position, with the edge 18 thereof properly spaced from the edge 53 of the piston flange 51, when the valve is seated, the ring 16 is locked in position by a lock pin 60 entering flutes 61 in the periphery of the ring 16.

From the foregoing description it will be clear that the valve of the present invention provides a number of advantages over the safety valves in current use, which may be catalogued as follows.

I. High lift resulting from:
 (A) Reversal of flow of pressure fluid by baffle constituted by the head surface 21 of the piston 20 and its extended skirt 25, and the employment of the reactive force of the jet thus produced.
 (B) Closing-off of the relief ports 54 of the baffle 21—27 near the end of the lift, whereby accumulation and increase of pressure under the baffle is developed.
 (C) Automatically variable baffle which increases the effective area of the baffle surface during progression of lift resulting in greater total pressure at and near the end of the lift.

II. Low blow-down due to:
 (A) Ported piston baffle which releases accumulation and partially nullifies the reactive force under piston baffle at a predetermined decrease in the boiler or system pressure, whereby acceleration of closing of the valve is effected.
 (B) Automatically variable baffle area which decreases the effective area of the baffle surface during closing movement of the valve resulting in a lowered total pressure as the valve closes.

III. Stability resulting from:
 (A) Large differential between the force acting under the piston at the start of the lift and the force exerted under it at accumulated pressure near the end of the lift.
 (B) Large differential between the force acting under the piston at maximum lift and the force exerted under it at any predetermined pressure at which the valve is to close.
 (C) Relatively low capacity at set-pressure lift and high capacity at accumulated pressure lift, whereby the valve is prevented from over-discharging at low accumulations, and whereby resultant drumming action is eliminated.

IV. Improved pressure-vessel protection:
 Because of the characteristics noted in III (C), any system including and protected by the valve of the present invention will not be subjected to injurious pressure fluctuations resulting from sudden and violent releases of or changes in pressure.

V. Less stress on seating surfaces of valve:
 Because, at the close-off pressure, the piston has shorter distance to travel.

VI. High discharge capacity.

I claim:

1. A pressure relief valve comprising an annular valve seat, a piston coaxial with and axially movable with respect to said seat, an annular seating surface on said piston for valve-closing engagement with said seat, an annular flat surface encircling said seat, a corresponding annular flat surface encircling said annular seating surface on said piston in closely adjacent parallel relation to the annular surface encircling said seat when said valve is closed, a frusto-conical baffle surface formed in one end of the piston in circumferential intersecting relation to said flat annular surface on said piston and, except when substantially fully open, extending therefrom axially beyond the plane of the annular surface encircling said seat in radially spaced outwardly flaring relation to the outer peripheral edge of the seat-encircling surface, a normally open circumferntially extending cavity formed in said piston in axially spaced relation to the plane of said flat annular surface thereof, means internally of the piston affording communication between said cavity and said piston annular surface, a cylindrical guide for said piston, said cavity and said guide having cooperating peripheral edges adapted to overlap and close said cavity under predetermined axial movement of said piston relative to said guide and said valve seat.

2. A pressure relief valve comprising a hollow body, a cylindrical piston guide carried by and extending into said hollow body, a piston reciprocable in said guide, an annular valve seat in said body in a plane spaced axially from the plane of the inner end of said guide, an annular seat-engaging surface on the inner end of said piston, said seat-engaging surface when lifted from said seat forming an annular escape port for fluid entering said body through said seat, a pair of flat annular surfaces surrounding said seat and said seating surfaces respectively, a frusto-conical baffle surface on said inner end of the piston outside said flat annular surfaces and forming a progressively variable-area port with the peripheral edge of the annular surface encircling said seat, a normally open annular external recess formed in the outer surface of said piston above said flat annular surface thereon, one peripheral side edge of said recess forming a variable area cut-off port with the inner peripheral edge of said guide, and internal ports formed in said piston and extending from said recess to said annular surface on said piston end said internal ports and recess affording escape of fluid from the region intermediate said flat annular surfaces to the exterior of the piston above said baffle.

THEODORE W. BERGQUIST.